Feb. 17, 1925.  1,526,642
C. H. NISSLEY
SPRAYING MACHINE
Filed Aug. 17, 1921

INVENTOR
Charles H. Nissley
BY
Kerr Page Cooper & Hayward
ATTORNEYS

Patented Feb. 17, 1925.

1,526,642

UNITED STATES PATENT OFFICE.

CHARLES H. NISSLEY, OF NEW BRUNSWICK, NEW JERSEY.

SPRAYING MACHINE.

Application filed August 17, 1921. Serial No. 492,931.

*To all whom it may concern:*

Be it known that I, CHARLES H. NISSLEY, being a citizen of the United States, residing at New Brunswick, in the county of Middlesex and State of New Jersey, have invented certain new and useful Improvements in Spraying Machines, of which the following is a full, clear, and exact description.

The present invention relates to spraying machines, and more particularly to that type of machine utilized in spraying or distributing liquids or dusts which are fatal or poisonous to bugs, insects, or parasites which retard or destroy plant growth, and also such materials for the control of fungus diseases and has for its object to provide an efficient machine for spraying liquids or dusts from above and below to a row or series of rows of plants, vines, etc.

I accomplish the object above set forth by mounting a supply of spraying material on a suitable vehicle and mounting a number of spray nozzles on a boom at the rear of the vehicle, said nozzles being positioned to trail along the ground and to spray the said plants from below, certain other nozzles, when desired, being added and mounted to spray said plants from above, suitable mechanism being provided to flexibly connect the nozzles trailing on the ground to the said boom whereby the lower nozzles may ride over obstructions in the path without disturbing the relative position of the nozzle and the plant being sprayed thereby, or throw the other nozzles attached to the boom out of alignment with the plants being sprayed thereby; and, further, in those cases where the vehicle is traveling over uneven ground, the ends of the boom being raised and lowered due to such unevenness, the couplings maintain the nozzles in the desired position with reference to the plants, and the highest efficiency is thereby attained.

By way of illustration, I have shown my invention in the accompanying drawings, in which—

Figure 1:
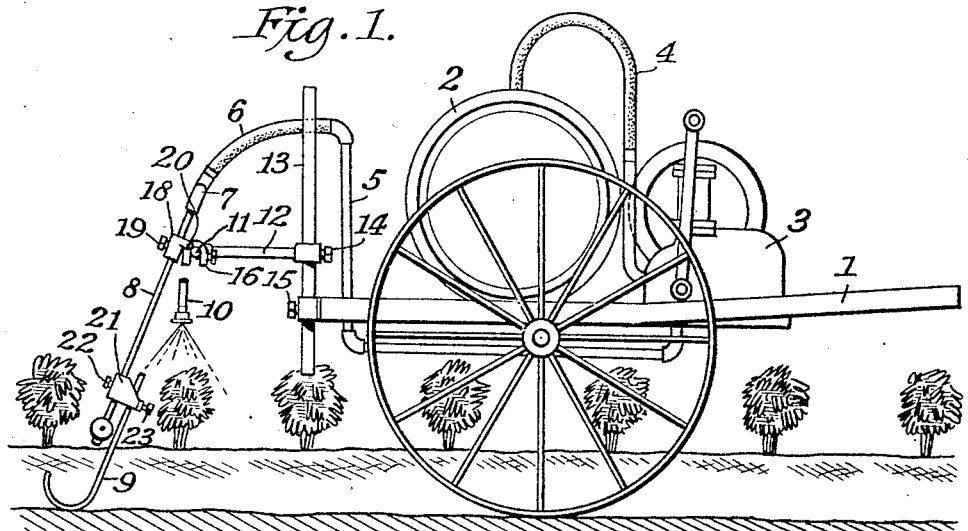
Fig. 1 is a side view of one embodiment of my invention.

In the drawings, 1 is a vehicle having mounted thereon a tank 2, containing spraying material. A force pump 3 draws the spraying material from the tank 2 through a flexible pipe 4, and forces said material through a pipe 5 to the rear of the vehicle, thence through a flexible pipe 6 to a distributing pipe 7, from which extends a spray pipe and nozzle 8, or a number of spray pipes and nozzles 8, 8 and, when desired, nozzles 10, 10. The nozzle pipe 8 or nozzle pipes 8, 8, as the case may be, trail near the ground and ride on a shoe 9, or shoes 9, 9, the spray therefrom accordingly being directed at the plant from below and upwardly, while the spray from the nozzle 10, or nozzles 10, 10, when it is desired to use them, is directed at the plant from above and downwardly, as will be readily understood, the plant in this way being thoroughly and efficiently covered by the spraying material.

The distributing pipe 7 and the spray pipes and nozzles 8 and 10 are supported in proper position on the vehicle 1 by means of a boom 11, mounted on horizontal arms 12, 12, extending from uprights 13, 13, on the vehicle 1. Suitable screws are indicated at 14 and 15 for adjusting the arms 12 and the uprights 13 when raising or lowering the boom 11 to the position desired above the plants to be sprayed.

Figure 3:
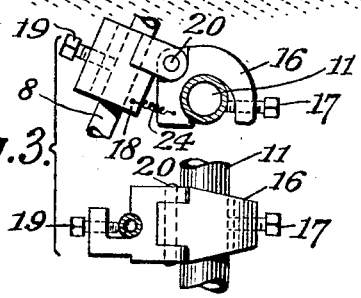
Fig. 3 is a detail view of mechanism for flexibly connecting the lower spray or sprays to the boom.
Figure 4:
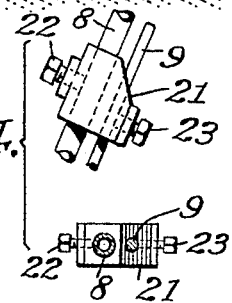
Fig. 4 is a detail view of the coupling for the trailing shoe.
Figure 2:
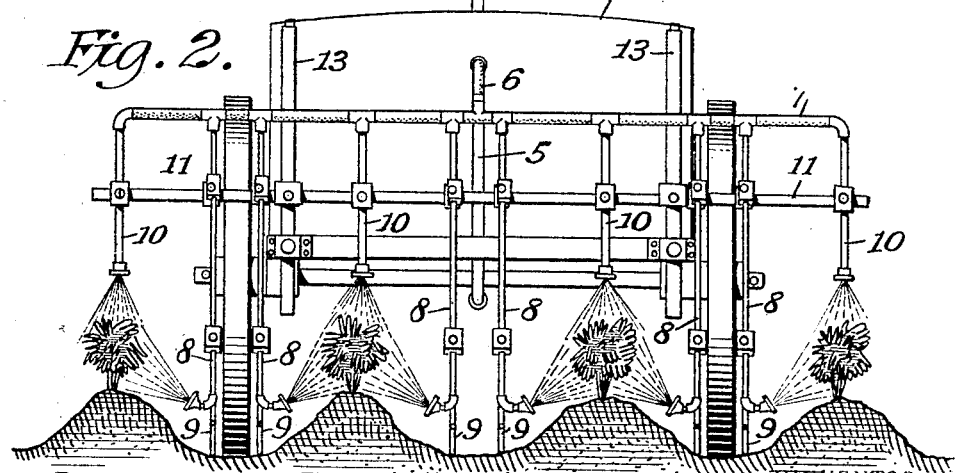
Fig. 2 is a rear elevation of the same.

When a flexible coupling is utilized for connecting the trailing nozzle 8 or nozzles 8, 8 to the boom 11, the rocking of the said boom and the possible bending or breaking of the nozzle pipe 8, which causes the nozzle to be thrown out of alignment or put out of use, is avoided when a shoe 9 strikes an obstruction and, on the other hand, the relative position of the trailing nozzle or nozzles and the plants sprayed thereby is not disturbed by the rocking of the boom due to the unevenness of the ground over which the vehicle 1 is travelling. Accordingly, I have shown a coupling comprising a yoke, 16, rigidly mounted on the boom, 11, by a set screw, 17, and a member, 18, to which the nozzle pipe, 8, is rigidly attached by a set screw, 19. The member, 18, is attached to the yoke 16, in such a way as to permit free movement of the member, 18, with reference to the rigid yoke, 16, and one means of accomplishing this is to hinge the member, 18, to the yoke, 16, as indicated at 20. A spring controlled coupling for certain classes of work is desirable, and, accordingly, I have shown such a spring at 24, Fig. 3. It will be understood that I do not limit myself to the use of the particular form of coupling shown, but contemplate the use of any suitable mechanism for accomplishing the desired result. The shoe, 9, is attached to the nozzle pipe, 8, by a block, 21, and set screws, 22 and 23, and is adjusted in position in a manner well understood by those skilled in the art.

What I claim is:

1. A spraying machine comprising a vehicle, a supply of spraying material thereon, a rigid conduit pipe and a spraying nozzle thereon connected to said supply and trailing on the ground, and means for pivotally supporting the rigid pipe and spraying nozzel on said vehicle and maintaining the said nozzle in any desired relative position to the object being sprayed.

2. A spraying machine comprising a vehicle, a supply of spraying material thereon, a boom rigidly connected to said vehicle, a rigid conduit pipe and a spraying nozzle connected to said supply and trailing on the ground, means for flexibly connecting the spraying nozzle to the said boom and permitting backward and forward movement of said nozzle in the direction of its travel, and means for adjusting said spray nozzle relative to the object being sprayed.

3. A spraying machine comprising a vehicle, a supply of spraying material thereon, a rigid conduit pipe and a spraying nozzle connected to said supply and trailing on the ground, means for pivotally supporting the rigid pipe and spraying nozzle on the vehicle, and means for maintaining the trailing nozzle in any desired relative position to the object being sprayed.

4. A spraying machine, comprising a vehicle, a supply of spraying material thereon, rigid conduit pipes and spraying nozzles connected to said supply and trailing on the ground, means for pivotally supporting the rigid pipes and trailing nozzles on the vehicle, and means for maintaining the trailing nozzles in any desired position relative to the object being sprayed.

5. In a spraying machine comprising a vehicle and a supply tank carried thereby, the combination of a spray nozzle, a conduit connecting said nozzle to said tank said conduit comprising a rigid pipe pivotally supported on said vehicle, ground engaging means carried by said rigid pipe and adjustable thereon to determine the angular relation of the nozzle to the surface being traversed by said vehicle.

6. In a spraying machine, comprising a vehicle and a supply tank carried thereby, the combination of a boom rigidly mounted on said vehicle, a conduit comprising a rigid pipe pivotally mounted on said boom and connected to said tank, and a spray nozzle on the end of said rigid pipe, and a ground engaging shoe on said pipe adjustable thereon to determine the angular position of the nozzle to the surface being traversed by said vehicle.

7. In a sprayer in combination, a boom, a multiplicity of parallel pipes extending along said boom and at an angle thereto, each of said pipes having a spray nozzle and means for pivotally mounting each of said pipes on said boom and for spacing and maintaining the respective nozzles along said boom and at any desired distance from the object being sprayed.

8. In a sprayer, a vehicle, a plurality of trailing spray nozzle pipes extending from said vehicle for spraying a plurality of rows of vegetation, and means for flexibly supporting each of the spray nozzle pipes individually from said vehicle and maintaining the said nozzle pipes in any desired position relative to the object being sprayed, whereby the action of a deviation in the path of one of said nozzle pipes is confined to said nozzle pipe.

In testimony whereof I hereto affix my signature.

CHARLES H. NISSLEY.